Nov. 11, 1969  H. D. BLACKMER  3,477,280
MULTIPOINT VIBRATION DETECTOR
Filed Feb. 3, 1966  3 Sheets-Sheet 1

HAROLD D. BLACKMER
INVENTOR
BY
BUCKHORN, BLORE, KLARQUIST & SPARKMAN
ATTORNEYS

Nov. 11, 1969  H. D. BLACKMER  3,477,280
MULTIPOINT VIBRATION DETECTOR
Filed Feb. 3, 1966  3 Sheets-Sheet 2
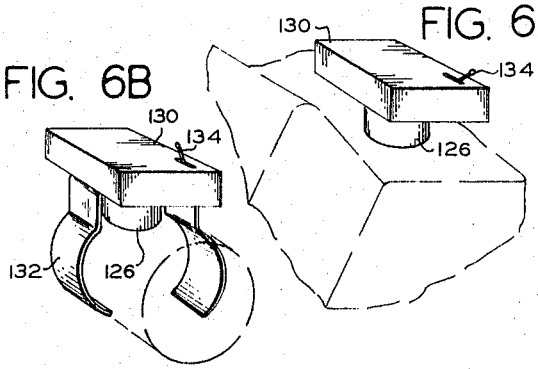
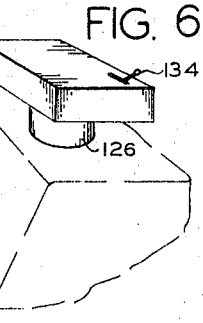
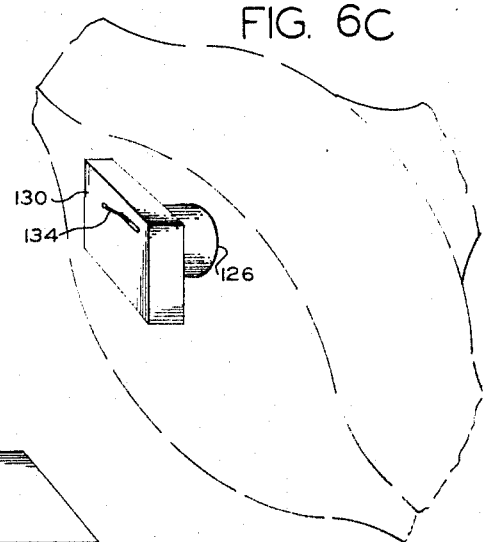
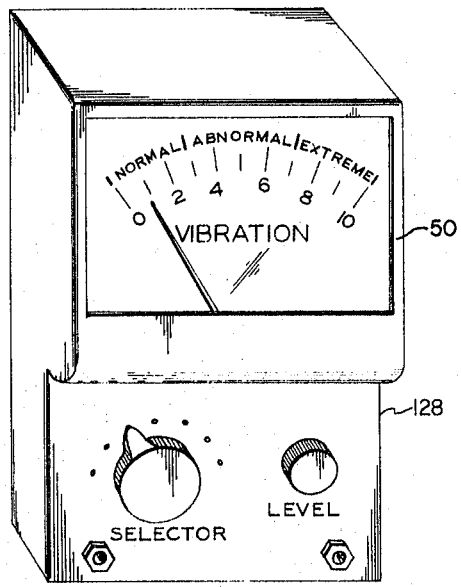
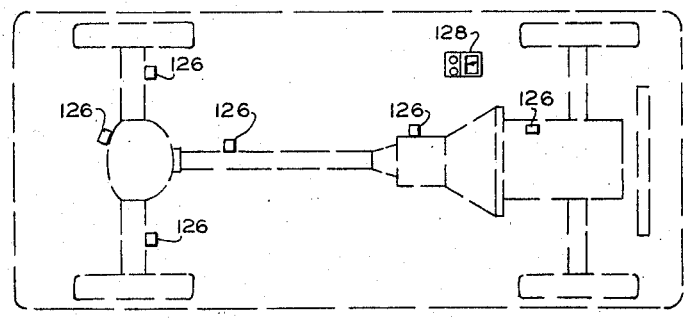
HAROLD D. BLACKMER
INVENTOR
BY
BUCKHORN, BLORE, KLARQUIST & SPARKMAN
ATTORNEYS Nov. 11, 1969　　　H. D. BLACKMER　　　3,477,280
MULTIPOINT VIBRATION DETECTOR Filed Feb. 3, 1966　　　　　　　　　　　　　　3 Sheets-Sheet 3

HAROLD D. BLACKMER
INVENTOR

BY
BUCKHORN, BLORE, KLARQUIST & SPARKMAN
ATTORNEYS 3,477,280
MULTIPOINT VIBRATION DETECTOR
Harold D. Blackmer, 11748 SE. Morrison,
Portland, Oreg. 97216
Filed Feb. 3, 1966, Ser. No. 535,278
Int. Cl. G01n 9/18
U.S. Cl. 73—71.4                               6 Claims

ABSTRACT OF THE DISCLOSURE

A probe attached to a movable piece of a transducer is vibrated to cause changes in a magnetic circuit of the transducer which are amplified by an amplifier having adjustable feedback. Several transducers attached to separated points on a machine each have a radio transmitter, and a radio receiver is selectively tuned to the transmitters.

---

Figure 1:
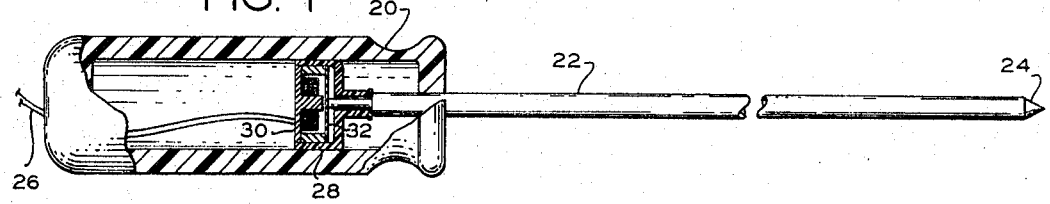

This invention relates a multipoint vibration detector and particularly to such a detector for locating specific machine vibrations in the presence of general background noise in a machine.

Excessive mechanical vibration in machinery may be indicative of faulty or malfunctioning components, the continued operation of which may lead to machine breakdown. In addition, excessive vibration noise can be a source of annoyance. For example in the case of automobile noise, the vibration is desirably located and eliminated.

Even though a vibration is audibly detectable, the source thereof is not always easily isolated to a particular portion of the machine, or to a particular faulty component, inasmuch as the vibration may be transmitted to surrounding machine elements. Likewise the offending vibration may be in part shielded by other noise or mixed with other noise generated in the machine. A vibration indicative of a faulty machine component may even be substantially inaudible to the human ear because of the presence of background noise. Conventional mechanical vibration detecting methods, including microphone or stethoscope means, and detection by ear, are usually ineffective in determining and pinpointing the source of noise.

It is, therefore, the object of the present invention to provide an improved vibration detector capable of substantially isolating a particular vibration source in a noisy background.

Another object of the present invention to provide improved vibration detector for conveniently and accurately determining the source of machine vibration through direct detection of such vibration, isolating such vibration from surrounding noise.

It is another object of the present invention to provide an improved vibration detector capable of detecting vibration at a plurality of selectable points in the machine, where such detector is capable of indicating the extent of vibration at a location remote from said points.

It is a further object of the present invention to provide an improved vibration detector for determining vibration along the power train of a machine, which may be in motion, for example as in the case of a moving automobile.

In accordance with the present invention a vibration detector includes transducer means for making direct rigid physical contact with selectable parts of a machine under test. In one embodiment, this transducer is substantially portable and may be moved by hand from one portion of the machine to another in order to compare the vibration occurring at different points, whereby the offending vibration may be singled out and the location thereof determined. In accordance with another embodiment a plurality of transducers are located at preselected points on a machine, for example along the power train of an automobile or other vehicle, which transducers are remotely selected for the purpose of determining the vibration at different points in the power train. In either case the transducer produces an alternating current signal in accordance with and representative of the vibrations at the point in the machine contacted. These vibrations are amplified in an alternating current amplifier, having adjustable gain, for audible reproduction in an audio output device, or the magnitude of vibrations may be directly displayed as by rectifying the alternating current signal and providing the same to a direct current instrument. Communicating means are provided for coupling the electrical signals from the transducer to the amplifier in a manner permitting selective movement and substantial portability of the transducer relative to the amplifier as well as positioning at a location remote from the amplifier and output means.

It has been found that with a system of the foregoing type, particular vibrations may be readily isolated and pinpointed within the machine whereby faulty components are more easily determined. For example, apparatus according to the present invention has been found very useful in locating faulty bearings, gears, valves, valve lifters, excessive turbulence in an automatic automobile transmission, and for many other purposes.

Figure 2:
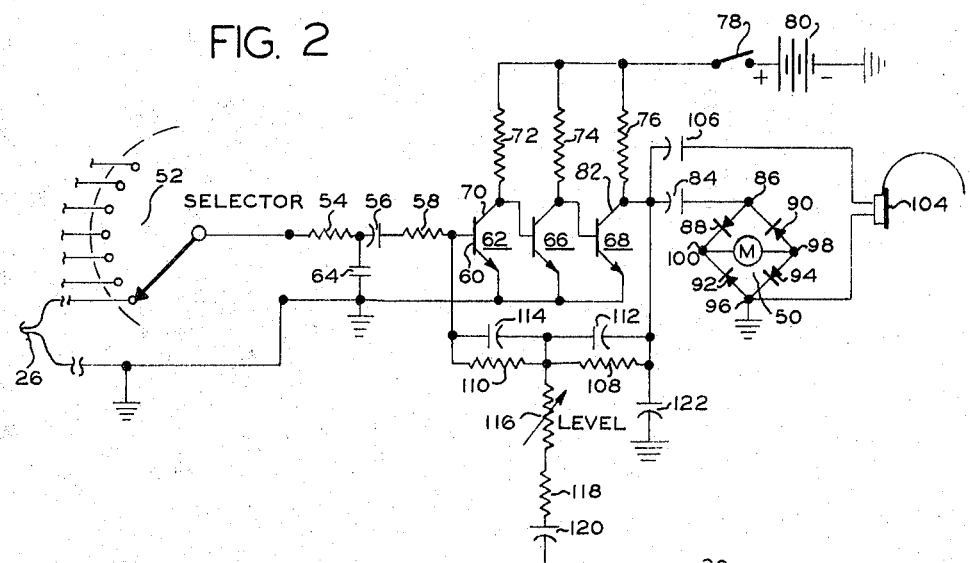
Figure 3:
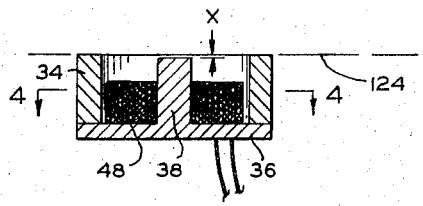
Figure 5:
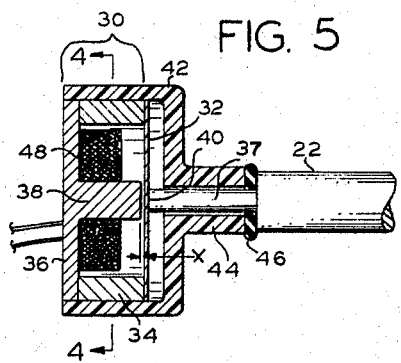
Figure 4:
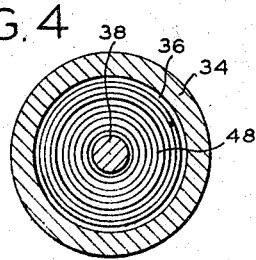
Figure 9:
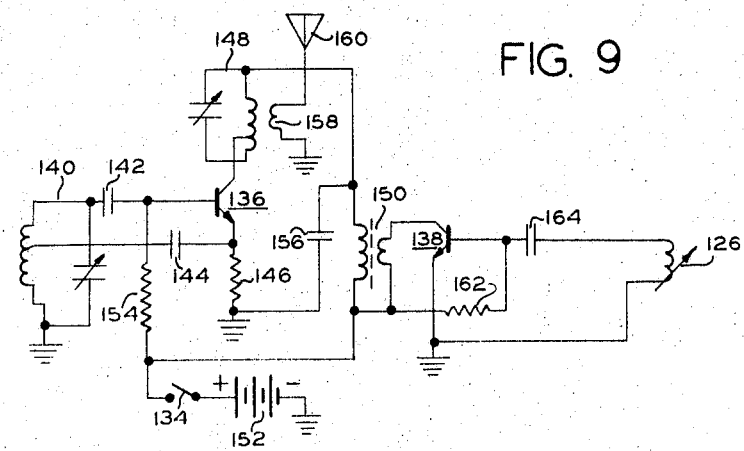
Figure 10:
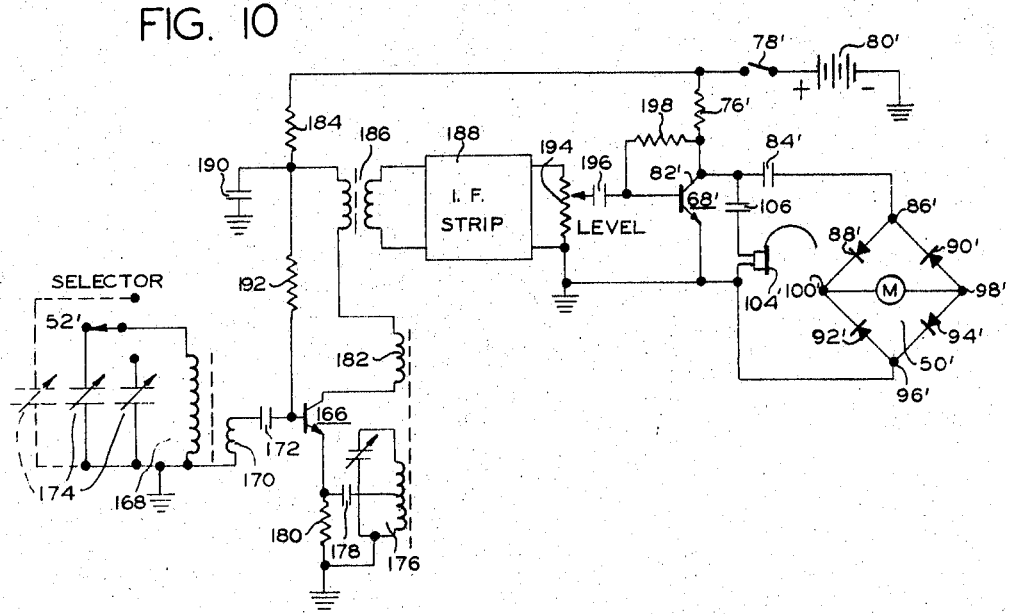

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements and in which:

FIG. 1 is a side view partially in cross section of a probe transducer in accordance with the present invention, FIG. 2 is a schematic diagram of a transistorized amplifier in accordance with the apparatus of the present invention, FIG. 3 is a vertical cross section of a second type of transducer according to the present invention, FIG. 4 is a horizontal cross section taken at 4—4 in FIG. 3 and in FIG. 5, FIG. 5 is a detailed cross section of a transducer in accordance with the present invention of the type illustrated in FIG. 1, FIGS. 6A, 6B and 6C illustrate placement of transducers in accordance with the present invention at various locations within a machine, and including high frequency radio transmitters attached thereto, FIG. 7 is a plan diagram of an automobile power train illustrating the placement of a plurality of transducers in accordance with the present invention along the power train, FIG. 8 is a front view of an encased portable amplifier and vibration meter in accordance with the present invention, FIG. 9 is a schematic diagram of a transistorized high frequency transmitter employed for communicating the output signal of a transducer to a remotely located amplifier, FIG. 10 is a transistorized high frequency receiver, amplifier, and meter for receiving the signals from the FIG. 9 device.

Referring to FIG. 1, a probe transducer in accordance with the present invention includes a handle grip 20 supporting a longitudinally extending metal shank 22 of the probe. This metal shank is suitably provided with a point as illustrated at 24 for engagement with vibrating machinery parts. The transducer probe is portable having flexible conductor lead wires 26 and therefore may be readily moved from one part of a machine under test to another part thereof. In employing the probe transducer of FIG. 1, one grasps the handle grip 20 and urges the point 24 into contact with portions of a machine under test in order to detect the magnitude of vibration occurring at such point.

The probe transducer of FIG. 1 includes an internal transducer portion generally indicated at 28 including a fixed portion 30, and a movable portion 32, secured to the shank 22. The transducer portion is secured within the handle grip 20 and the shank 22 is slidably or movably secured therewithin. The details of the FIG. 1 transducer construction are illustrated more clearly in FIGS. 4 and 5.

Referring to FIGS. 4 and 5, and particularly the latter, fixed portion 30 of the transducer includes an annular magnet 34 to which is attached a soft iron back plate 36 having a single pole piece 38 extending co-axially through magnet 34. A pickup coil 48 surrounds the pole piece. Movable portion 32 of the transducer comprises a spring steel diaphragm secured to the circumference of magnet 34 but spaced from pole 38 by a small distance "$x$" on the order of $5/1000$ of an inch. An extended shank 37 is secured to movable portion 32 at central location 40 employing for example, epoxy cement. A plastic cover 42 encases at least the forward portion of the transducer including extended shank 37. The extended shank slides within bushing 44, the latter comprising a part of this cover. The shank 22 is yieldably secured at the front of bushing 44 employing a rubber spacer 46 cemented to both the bushing and the shank. During operation of the transducer, vibrations transmitted via shank 22 cause movable portion 32 to vibrate relative to pole piece 38. The magnet 34 together with back plate 36, pole piece 38 and movable portion 32 comprise a magnetic circuit except for a gap "$x$," between pole piece 38, and movable portion 32. During vibration of the movable portion 32, this spacing "$x$," varies and an A.C. voltage is induced in pickup coil 48 which corresponds in waveform to the vibrations transmitted through shank 22 from the machine being tested. Rapid movement of the machine produces an alternating current corresponding to such movement.

Referring to FIG. 2, the alternating current signal from the pickup coil of the transducer is communicated to an amplifier for causing the amplitude of the vibrations to be registered upon a meter 50. These signals are communicated via lead wires 26 from the pickup coil on the transducer and through one contact of a multiple contact switch 52 to the input circuit of the amplifier. The amplifier is of the operational type having a substantial amount of feedback from the output to the input thereof, but which feedback is adjustable in order to vary the amount of amplification produced.

Referring to the details of the FIG. 2 circuit, resistor 54, connected to the adjustable contact of switch 52, is a calibration resistor coupling the input signal to operational amplifier input resistor 58 via input capacitor 56, and from resistor 58 to base 60 of a first transistor 62. A small capacitor 64 is connected from the junction of resistor 54 and capacitor 56 to ground in order to reduce high frequency interference. Two further transistor stages including transistors 66 and 68 are connected in cascade relation taking the signal output from the collector 70 of input transistor 62 and additionally amplifying the signal. Dropping resistors 72, 74 and 76 connect the collectors of the transistors to one contact of a switch 78 employed for selectively supplying current to the circuit from a battery 80. Each of the transistors is an NPN type and, therefore, battery 80 provides a positive voltage to the switch with respect to ground. The output of the three stage amplifier is taken at collector 82 of transistor 68 and then coupled via a capacitor 84 to input terminal 86 of a bridge rectifier circuit including diodes 88, 90, 92 and 94. These rectifiers are connected in a conventional bridge circuit between input terminal 86 and terminal 96 which is grounded. Across the conjugate terminals 98 and 100 of the bridge circuit there is disposed an output meter 50 which registers the magnitude of the alternating current signal provided by the transducer and amplifier within the amplifier. The bridge comprising diodes 88, 90, 92 and 94 rectifies the amplified alternating current waveform whereby meter 50 may be a direct current instrument. The vibration signal is audibly reproduced in a headphone 104 coupled between ground and collector 82 of output transistor 68 via a coupling capacitor 106.

An adjustable amount of feedback is provided in the circuit of FIG. 2 through a network comprising resistors 108 and 110 connected in series between collector 82 of transistor 68 and base 60 of transistor 62. Capacitors 112 and 114 are shunted across these resistors for purposes of high frequency compensation. The midpoint of resistors 108 and 110 is coupled through a variable resistor 116, a resistor 118 and a capacitor 120 to ground, while at the end of the network connected to collector 82 is also coupled to ground with a capacitor 122 having a very small value of capacitance. Variation of variable resistor 116 between maximum and minimum value is arranged to change the degree of amplification between a value of thirty and an amplification value of aprroximately three thousand. The minimum gain is provided by the circuit when variable resistor 116 has its maximum value. At this time the maximum feedback occurs between the input and the output of the circuit. As the resistance of variable resistor 116 is decreased, the series circuit including resistors 116 and 118 and capacitor 120 tends to short out the feedback circuit therefore allowing the amplifier to provide greater gain. The frequency response of the amplifier is determined by the values of capacitors 120 and 122.

With the transducer probe of FIG. 1 coupled to the amplifier of FIG. 2 by way of flexible conductor leads 26, alternating currents generated within the transducer caused by vibration of its movable portion, are coupled to the input of the amplifier. This alternating current signal is sampled through the successive transistor stages and is then audibly detected with an audio-reproducing means comprising headphone 104. The value or magnitude of the alternating current waveform within the amplifier is representative of the vibrations from the transducer and is directly registered on meter 50. The bridge rectifier comprising diodes 88, 90, 92 and 94 detect or rectify this waveform and present it as a varying direct current to the meter 50.

The operational amplifier circuit employed provides a wide variation in amplification (two orders of magnitude) having a volume response somewhat similar to the human ear. It also exhibits good signal to noise characteristics and stability while being relatively insensitive to such noise as may occur in volume adjustment such as within variable resistor 116.

The apparatus according to the present invention as illustrated in FIGS. 1 and 2 is utilized in the following manner: The probe transducer is thrust against a machine under test, insuring solid or rigid physical contact between such machine and the point of the probe transducer. The vibration is heard through headphone 104, while variable resistor 116 is adjusted such that an audible vibration is heard in the headphone but with a volume which is not excessive. At the same time the resistor 116 is adjusted such that the vibration should cause a moderate deflection of meter 50. Normal vibration or the background vibration of the machine under test, found by moving the probe to various locations on the machine, should register on the left-hand or low side of the meter 50 located within the portable amplifier case as illustrated in FIG. 8. That is the meter should register upon the portion of the meter scale designated "normal." Preferably this background vibration should be reduced in volume, by means of variable resistor 116, until it is barely audible in the headphone. In this manner, points on the machine exhibiting excessive vibration will then stand out and will be more readily detectable not only since they produce a greater volume in headphone 104, but also by providing midscale or greater deflection of the meter.

Sometimes movement of the probe a matter of inches or less upon the machine under test will make appreciable difference in the magnitude of the amplified signal. It should be stressed that this difference in vibration amplitude is not ordinarily detectable by ear nor with conventional microphone or stethoscope means. The direct contacting probe in accordance with the present invention derives vibration substantially directly from the source thereof and also filters out unwanted surrounding noises.

It is possible with the present apparatus to detect a wide variety of faulty machine components such as faulty operating valves, bearings, gears and even excessive turbulence in an automatic automobile transmission. Moreover excessive arcing from a sparkplug can be detected while an automobile is operating. Also, the source of excessive exhaust noise can be located. Of course, many other sources of undesired vibration can be determined.

It should be noted that the loudest or highest amplitude vibration may not always be one indicating the faulty part. Sometimes the noise from correctly operating machine components may shield an undesired vibration. However, an abnormal vibration can be located by moving the probe to various points on the machine until the characteristic normal sound or pitch of normal machine noise is recognized in the headphone. Then, even though this background is present, the addition of an abnormal vibration will be readily recognized.

FIG. 3 illustrates a second type of transducer according to the present invention, with FIG. 4 illustrating a cross section of the same. The FIG. 3 transducer is the same as regards like elements referred to with like reference numerals as the transducer illustrated and described in connection with FIGS. 1 and 5. However, the FIG. 3 transducer does not require a diaphragm or movable portion 32 as illustrated in FIG. 5. Rather the transducer of FIG. 3 utilizes the surface 124 of the machine under test for performing the function of a diaphragm. Since annular magnet 34 is longer in the axial direction than pole piece 38, an air-gap indicated by the distance "x" exists between the pole piece and surface 124. As the machine 124 vibrates, this gap varies slightly and induces alternating currents in pickup coil 48. The transducer is suitably coupled to the FIG. 2 amplifier in the same manner as hereinbefore described.

The transducer of FIGS. 3 and 4 under most circumstances secures itself to the metal surface of the machine under test by means of the attraction between magnet 34 and the machine surface, this surface completing a portion of the magnetic circuit. Of course, the machine surface must be formed of a material such as iron having magnetic properties. A diaphragm may be additionally provided, however, and also additional or auxiliary means may be applied to secure the transducer to the machine.

The FIG. 3 transducer has several advantages. In addition to semi-permanent self attachment to a selected portion of a machine, it may be readily moved from one portion of a machine to another or even for a short distance along the machine while still attaching itself to the machine surface. Moreover the surrounding magnet and magnetic circuit shields the transducer from outside influence including electrical interference.

In accordance with one aspect of the present invention, the several transducers, e.g. of the FIG. 3 type, are attached to various portions of a particular machine. In an exemplary instance, a plurality of such transducers are secured at separate locations along the power train of an automobile, for example with one or more such transducers located upon the automobile motor block, and one or more on the automobile transmission, the differential, rear-axle housing, etc. This application is illustrated in FIGS. 6A, 6B, 6C and 7, wherein transducers 126 are disposed at various locations along the power train in an automobile. The various transducers are suitably wired to an amplifier of the FIG. 2 type through separate fixed contacts of selector switch 52, one of each transducer, and employing the automobile ground as a common connection. The amplifier 128 in FIGS. 7 and 8 may then be located within the automobile for convenient access thereto by the automobile's operator. Then, by operating selector switch 52, one may conveniently determine the vibration occurring at separate locations along the automobile's power train. This arrangement is particularly useful since it can be employed while the automobile is moving at any speed. Therefore, vibrations which are only encountered as the automobile is driven and when the automobile reaches certain critical speeds, are readily ascertainable.

A circuit employing a plurality of transducers of the FIG. 3 type connected directly to a common amplifier via a selector switch 52 is of considerable advantage in a moving vehicle in locating various vibrations, but is sometimes inconvenient because of the necessity of providing a connector lead between each transducer and the amplifier. It is therefore of further advantage to provide a radio transmitter integrally attached to each transducer and a radio receiver associated with the common amplifier. Transmitters 130 are conveniently attached to each of separately located transducers 126 as illustrated in FIGS. 6A, 6B and 6C. These transmitters are conveniently supported upon transducers 126, but an additional attaching strap such as illustrated at 132 in FIG. 6B may sometimes be desirable. Each transmitter is transistorized and self-contained and provided with internal batteries as well as an off-on switch 134. Each transmitter produces a high frequency radio signal modulated with the mechanical vibrations from the separate portion of the automobile's power train. In FIG. 6A, the transducer is located upon a portion of the motor block while in FIG. 6B vibrations are being detected from an axle-housing. In FIG. 6C, the transducer receives vibrations from the automobile differential. A single receiver is conveniently located within a single amplifier case and conventiently provided with a selector switch, as illustrated in FIG. 8, for singling out the transmitter associated with a selected transducer in a different part of the automobile. The circuitry for a transistorized transmitter and receiver is illustrated in FIGS. 9 and 10.

Referring to FIG. 9, a transistorized transmitter for employement in conjunction with a vibration transducer includes an oscillator stage including a transistor 136 and a modulator stage including a transistor 138. The oscillator is of the Hartley type having a parallel tuned circuit 140 coupled between ground and the base of transistor 136 with a capacitor 142 located between the transistor base and the tuned circuit. The tuned circuit's inductance is provided with a tap which is coupled to the emitter of transistor 136 via capacitor 144, while an emitter resistor 146 returns the emitter to ground. A second parallel tuned circuit 148 is provided, tuned to approximately the same frequency and having a tap on the inductance thereof connected to the collector of transistor 136. One end of the tuned circuit 148 is coupled through the secondary of an audio-transformer 150 to a switch 134 employed for the purpose of connecting and disconnecting battery source 152 disposed between switch 134 and ground. A base resistor 154 connects the base of transistor 136 to the switch for providing the proper D.C. base voltage. Bypass capacitor 156 connects the junction between tuned circuit 148 and the primary of transformer 150 to ground completing a circuit for high frequency currents while an output loop 158 inductively coupled to the inductance of tuned circuit 148 is conductively interposed between ground and an antenna 160.

The primary of transformer 150 is connected between the collector of transistor 138 and switch 134 with the emitter of transistor 138 being connected to ground. Resistor 162 supplies the proper D.C. voltage for the base of transistor 138 by coupling the transistor's base to switch 134. A transducer 126, providing the circuit's input, is disposed electrically between ground and the base input of transistor 138 via a coupling capacitor 164.

The circuit of FIG. 9 produces oscillations at a high frequency determined by tuned circuit 140 which provides feedback between the collector-emitter current path of transistor 136 and the base thereof. These oscillations, being amplified by transistor 136, are coupled to the antenna 160 where they are radiated for reception by a remotely located receiver.

The oscillator is modulated with an alternating current audio signal comprising the vibrations of the machine under test determined via transducer 126. Transducer 126 provides an input to the amplifier including transistor 138 and the output of this amplifier is coupled to the primary of transformer 150. Since the secondary of transformer 150 is connected in the collector current path of transistor 136, audio frequencies amplified by transistor 138 are impressed upon, and modulate, the amplitude of the oscillations, and therefore, properly modulated oscillations reach antenna 160.

FIG. 10 schematically illustrates a transistorized radio receiver adapted for detecting and amplifying signals from the FIG. 9 transmitter. This receiver is associated with an amplifier of the type diagramed in FIG. 2 and may be housed in the same case therewith, for example, as illustrated in FIG. 8. In the FIG. 10 schematic diagram, the primed reference numerals refer to components having like numbered reference numerals in the FIG. 2 diagram and these components operate in substantially the same manner to provide an audible indication of vibration in headphone 104' while the magnitude of the vibration is directly read upon meter 50'.

The FIG. 10 receiver includes an input stage employing a transistor 166 in an autodyne convertor circuit. An input parallel turned circuit 168 has its inductance coupled to a secondary 170 for providing input signals to the base of transistor 166 via capacitor 172. The tuned circuit 168 includes a plurality of variable tuning capacitors 174 selected by means of switch 52' for varying the frequency to which the circuit is tuned and therefore the frequency of the signal which will enter the receiver. If a plurality of transducers mounted in separate locations as illustrated in FIGS. 6A, 6B and 6C are each provided with a transmitter 130 tuned to a separate frequency, each of the capacitors 174 in FIG. 10 may be tuned to a separate such frequency and, therefore, selector switch 52' can select a transmitter and a desired separately located transducer in the machine under test. Of course, other means may be employed for conveniently changing and selecting the frequency of the oscillator. The inductance of tuned circuit 168 may conveniently comprise an input antenna loop, or alternatively other conventional antenna means may be employed with the circuit.

A separate parallel tuned circuit 176 is coupled via a capacitor 178 from a tap on the inductance of the tuned circuit to the emitter of transistor 166. A resistor 180 returns the emitter to ground likewise one end of the tuned circuit 176 is returned to ground. A coupling coil 182 is inductively coupled to the inductance of tuned circuit 176 and is connected to the collector of transistor 166 for providing feedback between emitter and collector causing the circuit including transistor 166 to oscillate at a frequency determined by the tuned circuit. The capacitor in circuit 176 as well as capacitors 174 are conveniently operated in ganged fashion such that a constant difference in frequency exists between the frequencies to which tuned circuits 168 and 176 are tuned, this frequency being termed the intermediate frequency of the receiver. The incoming radio signal and the oscillation at the frequency of tuned circuit 176 mix to provide this intermediate frequency in a conventional manner well known to those skilled in the art.

Collector voltage is provided transistor 168 from battery 80' via switch 78' through a dropping resistor 184 and the primary of I.F. transformer 186 and through winding 182 to the collector of the transistor 166. The intermediate frequency signal is coupled via the primary of transformer 186 to the secondary thereof and therefore to an I.F. strip or amplifier 188 functioning to amplify signals at the aforementioned intermediate frequency. A capacitor 190 bypasses the junction between resistor 184 and the primary of transformer 186 to ground while a resistor 192 provides the proper voltage from this point to the base of transistor 166.

The output of I.F. amplifier 188 is coupled across a potentiometer 194 having its tap coupled via capacitor 196 to the base of transistor 68' the latter functioning as an audio frequency amplifier. A resistor 198 located between the collector and base of the transistor provides the proper operating voltage for the transistor base. Adjustment of potentiometer 194 varies the relative magnitude or volume of all vibration signals received in the receiver and therefore, the sound level at headphone 104' as well as the general level of readings at meter 50'. Potentiometer 194 is varied as hereinbefore more particularly discussed so that a particular vibration can be more easily separated from background noise. The system thus employing radio coupling as a communication link between the transducer and amplifier operates in substantially the same manner as regarding adjustment and detection of vibrations as hereinbefore discussed, but has the substantail advantage of requiring no wiring between transducer and amplifier.

While I have shown and described several embodiments of my invention, it will be apparent to those skilled in the art that many changes and modifications may be made without departing from my invention in its broader aspects. I therefore intend the appended claims to cover all such changes and modifications as fall within the spirit and scope of my invention.

I claim:

1. Apparatus for determining the vibration of portions of a machine relative to other portions of said machine according to the magnitude of vibration thereof for the purpose of discovering defective machine parts and other sources of excessive vibration, comprising:

transducer means adapted for making direct physical contact with selected points upon said machine and producing electrical output signals in accordance with vibration in the immediate area of said physical contact, said transducer means including electrical means for detecting rapid movement of said machine at the location of physical contact and producing an alternating current corresponding to said movement, alternating current amplifier means for receiving signals from said transducer and directly amplifying said signals as an alternating current waveform, output means for registering the said waveform as amplified and therefore indicating the magnitude of vibration of said machine in the immediate area of transducer contact, and means for communicating electrical sginals from said transducer means to said amplifier means in a manner permitting selective movement and remote location of said transducer means relative to said amplifier means, said amplifier means comprising a transistorized operational amplifier with adjustable feedback for determining the extent of amplification thereof and therefore the amplitude of current reaching said output means.

2. The apparatus according to claim 1 wherein said transducer means comprises a probe including a handle for gripping said probe, and a rigid shank extending there-from having a remote end for selectively engaging said machine when thrust theretoward by means of said handle,
said transducer means including said electrical means secured to said handle for detecting vibration of said shank, said electrical means having a fixed part secured to said handle and a relatively moveable part engaging said shank.

3. The apparatus according to claim 1 including a further plurality of said transducers located at spaced locations in said machine along a power train thereof producing electrical signals representative of vibration at said locations,
means to secure said transducers to said machine along said power train,
said amplifier being positioned at a location remote from said transducers and further including a selector switch for selectively connecting one of said transducers to said amplifier.

4. Apparatus for determining the vibration of portions of a machine relative to other portions of said machine according to the magnitude of vibration thereof for the purpose of discovering defective machine parts and other sources of excessive vibration, comprising:
transducer means adapted for making direct physical contact with selected points upon said machine and producing electrical output signals in accordance with vibration in the immediate area of said physical contact, said transducer means including electrical means for detecting rapid movement of said machine at the location of physical contact and producing an alternating current corresponding to said movement,
alternating current amplifier means for receiving signals from said transducer and directly amplifying said signals as an alternating current waveform,
output means for registering the said waveform as amplified and therefore indicating the magnitude of vibration of said machine in the immediate area of transducer contact, and
means for communicating electrical signals from said transducer means to said amplifier means in a manner permitting selective movement and remote location of said transducer means relative to said amplifier means,
said transducer means including a magnetic circuit having an air-gap and a source of substantially steady magnetic flux, and further including a pickup coil coupled to said circuit, the vibration imparted to said transducer changing the spacing of said gap for producing an alternating current electrical signal in said pickup coil,
said source of substantially steady magnetic flux comprising a permanent magnet adapted for attaching by magnetic attraction to a metal part of said machine and wherein the magnetic circuit includes at least one pole spaced from said machine when said transducer is in magnetic engagement therewith providing said air-gap between said pole and said part of said machine.

5. Apparatus for determining the vibration of portions of a machine relative to other portions of said machine according to the magnitude of vibration thereof for the purpose of discovering defective machine parts and other sources of excessive vibration, comprising:
transducer means adapted for making direct phyiscal contact with selected points upon said machine and producing electrical output signals in accordance with vibration in the immediate area of said physical contact, said transducer means including electrical means for detecting rapid movement of said machine at the location of physical contact and producing an alternating current corresponding to said movement,
alternating current amplifier means for receiving signals from said transducer and directly amplifying said signals as an alternating current waveform,
output means for registering the said waveform as amplified and therefore indicating the magnitude of vibration of said machine in the immediate area of transducer contact,
means for communicating electrical signals from said transducer means to said amplifier means in a manner permitting selective movement and remote location of said transducer means relative to said amplifier means,
a high frequency radio transmitter located substantially integrally with said transducer means, and
a high frequency radio receiver substantially integrally attached to said amplifier means,
said transmitter and receiver providing said means for communicating between said transducer means and said amplifier means.

6. In a vibration detector,
a hollow handle grip,
an annular magnet,
a soft iron back secured to one end of the magnet and having a pole coaxial with the magnet,
a pickup coil positioned inwardly from the magnet and outwardly from the pole,
a movable disc of magnetic material abutting the other end of the magnet,
a cupped cover fitting in the grip and fitting on the magnet and providing an air gap between said disc and the end of said pole and having a bushing portion,
a metal shank having a reduced end portion extending through the bushing and secured fixedly to the disc, the metal shank extending through the grip,
and a resilient annular spacer positioned between the end of the bushing and the shank.

References Cited
UNITED STATES PATENTS

| | | | |
|---|---|---|---|
| 1,686,138 | 10/1928 | Marvel | 73—71.4 XR |
| 2,596,048 | 5/1952 | Severs | 73—71.4 |
| 3,144,774 | 8/1964 | Bjorn | 73—71.4 |
| 2,979,940 | 4/1961 | Damewood et al. | 73—71.4 |

FOREIGN PATENTS

| | | |
|---|---|---|
| 664,160 | 1/1952 | Great Britain. |

RICHARD C. QUEISSER, Primary Examiner

J. R. FLANAGAN, Assistant Examiner

PO-1050
(5/69)

UNITED STATES PATENT OFFICE
CERTIFICATE OF CORRECTION

Patent No. 3,477,280      Dated November 11, 1969

Inventor(s) Harold D. Blackmer

It is certified that error appears in the above-identified patent and that said Letters Patent are hereby corrected as shown below:

Column 4, line 7, "amplifier" should be -- amplified;
Column 4, line 21, "at" should be deleted;
Column 4, line 27, the spelling of "approximately" should be corrected;
Column 4, line 43, "sampled" should be -- amplified.-- .
Column 5, lines 46 and 47, after "machine" and before "124" should be inserted -- surface -- .
Column 6, line 7, "of" should be -- for -- ;
Column 6, line 51, the spelling of "employment" should be corrected.
Column 7, line 41, "turned" should be -- tuned -- ;
Column 7, line 63, after "ground" should be inserted -- and -- .
Column 8, line 33, the spelling of "substantial" should be corrected ;
Column 8, line 63, the spelling of "signals" should be corrected .
Column 10, line 3, the spelling of "physical" should be corrected.

SIGNED AND
SEALED
MAY 12 1970

(SEAL)
Attest:

Edward M. Fletcher, Jr.
Attesting Officer

WILLIAM E. SCHUYLER, JR.
Commissioner of Patents